United States Patent
Strobietto

(10) Patent No.: US 9,993,927 B2
(45) Date of Patent: Jun. 12, 2018

(54) TOOL-INCLINING SYSTEM

(71) Applicant: ROBOTOOLS S.r.l., Turin (IT)

(72) Inventor: Elio Strobietto, Turin (IT)

(73) Assignee: Robotools S.r.l., Turin (IT)

( * ) Notice: Subject to any disclaimer, the term of this patent is extended or adjusted under 35 U.S.C. 154(b) by 9 days.

(21) Appl. No.: 15/066,675

(22) Filed: Mar. 10, 2016

(65) Prior Publication Data

US 2016/0263750 A1    Sep. 15, 2016

(30) Foreign Application Priority Data

Mar. 12, 2015  (IT) .......................... 102015000008379

(51) Int. Cl.

| | |
|---|---|
| *B25J 17/00* | (2006.01) |
| *B25J 17/02* | (2006.01) |
| *B25J 11/00* | (2006.01) |
| *B23Q 1/52* | (2006.01) |
| *B23Q 5/04* | (2006.01) |

(52) U.S. Cl.
CPC .......... *B25J 17/0208* (2013.01); *B23Q 1/525* (2013.01); *B23Q 5/045* (2013.01); *B25J 11/005* (2013.01)

(58) Field of Classification Search
CPC ...... B25J 19/063; B25J 15/04; B25J 15/0416; B25J 17/0241; B25J 17/0275; B25J 19/06; B25J 9/144; B23K 9/287; F16P 7/00

See application file for complete search history.

(56) References Cited

U.S. PATENT DOCUMENTS

| | | | |
|---|---|---|---|
| 4,639,184 A * | 1/1987 | Knasel ................... | B25J 19/063 294/86.4 |
| 4,998,606 A * | 3/1991 | McCormick ........... | B25J 19/063 192/56.32 |
| 5,361,881 A | 11/1994 | Simond | |

(Continued)

FOREIGN PATENT DOCUMENTS

| | | |
|---|---|---|
| DE | 199 25 688 | 12/1999 |
| DE | 101 32 117 | 11/2002 |

(Continued)

OTHER PUBLICATIONS

Search Report and Written Opinion for IT 102015000007389, dated Oct. 20, 2015, 7 pages.

*Primary Examiner* — Bradley Duckworth
(74) *Attorney, Agent, or Firm* — Nixon & Vanderhye P.C.

(57) ABSTRACT

Disclosed herein is a tool-inclining system, which is characterized in that it is provided with a structure that is simple, compact, and able to operate according to an altogether reliable mode of operation.
The system comprises:
  a base for securing said system to a structure that is to carry said tool, such as a robot arm;
  a support on which said tool is to be fixed, said support being configured in such a way that said tool fixed to said support defines a working axis (S);
  a connection member for connection of said support to said base, said member allowing a given angular movement of said support so that said working axis displaces, starting from a neutral position, according to a tilting movement; and
  fluid countering means or elastic countering means, which act on said support so as to exert an action that counters said tilting movement.

10 Claims, 9 Drawing Sheets

(56) References Cited

U.S. PATENT DOCUMENTS

| | | | | |
|---|---|---|---|---|
| 5,697,480 | A * | 12/1997 | Herbermann | B25J 19/063 192/150 |
| 5,697,534 | A * | 12/1997 | Huyghe | B05B 15/065 222/527 |
| 5,941,679 | A * | 8/1999 | Foti | B25J 15/0019 414/737 |
| 6,069,415 | A * | 5/2000 | Little | F16P 7/00 307/326 |
| 7,382,145 | B2 * | 6/2008 | Thurmaier | G01R 31/2887 269/309 |
| 2004/0175227 | A1 * | 9/2004 | Munch | B23K 9/287 403/287 |
| 2010/0218626 | A1 | 9/2010 | Love et al. | |
| 2015/0043960 | A1 * | 2/2015 | Strobietto | B25J 15/04 403/31 |

FOREIGN PATENT DOCUMENTS

| | | |
|---|---|---|
| EP | 0 307 550 | 3/1989 |
| GB | 1 374 997 | 11/1974 |

* cited by examiner

TOOL-INCLINING SYSTEM

This application claims priority to IT 102015000008379 filed 12 Mar. 2015, the entire contents of which is hereby incorporated by reference.

The present invention relates to a tool-inclining system.

In the field of industrial machining, there may exist the need to provide a compensation system that will allow the tool to adapt to the specific morphology of the workpieces so as to guarantee a uniform machining quality irrespective of the defects and the specific characteristics of the workpieces.

In this context, the present invention proposes a tool-inclining system that enables the tool to vary its orientation according to the specific morphology of the workpieces on which it is operating.

As will emerge clearly from what follows, the system described herein is characterized in that a simple and compact structure is provided, which is able to operate according to an altogether reliable mode of operation.

The system described herein is defined in particular in the ensuing claims. The claims form an integral part of the technical teaching provided herein in relation to the invention.

Further characteristics and advantages of the invention will emerge clearly from the ensuing description with reference to the annexed drawings, which are provided purely by way of non-limiting example and in which.

In the ensuing description, various specific details are illustrated aimed at providing an in-depth understanding of the embodiments. The embodiments may be provided without one or more specific details, or with other methods, components, materials, etc. In other cases, known structures, materials, or operations are not described in detail to prevent various aspects of the embodiments from being obscured.

The references used herein are only provided for convenience and hence do not define the sphere of protection of the embodiments.

Figure 1:
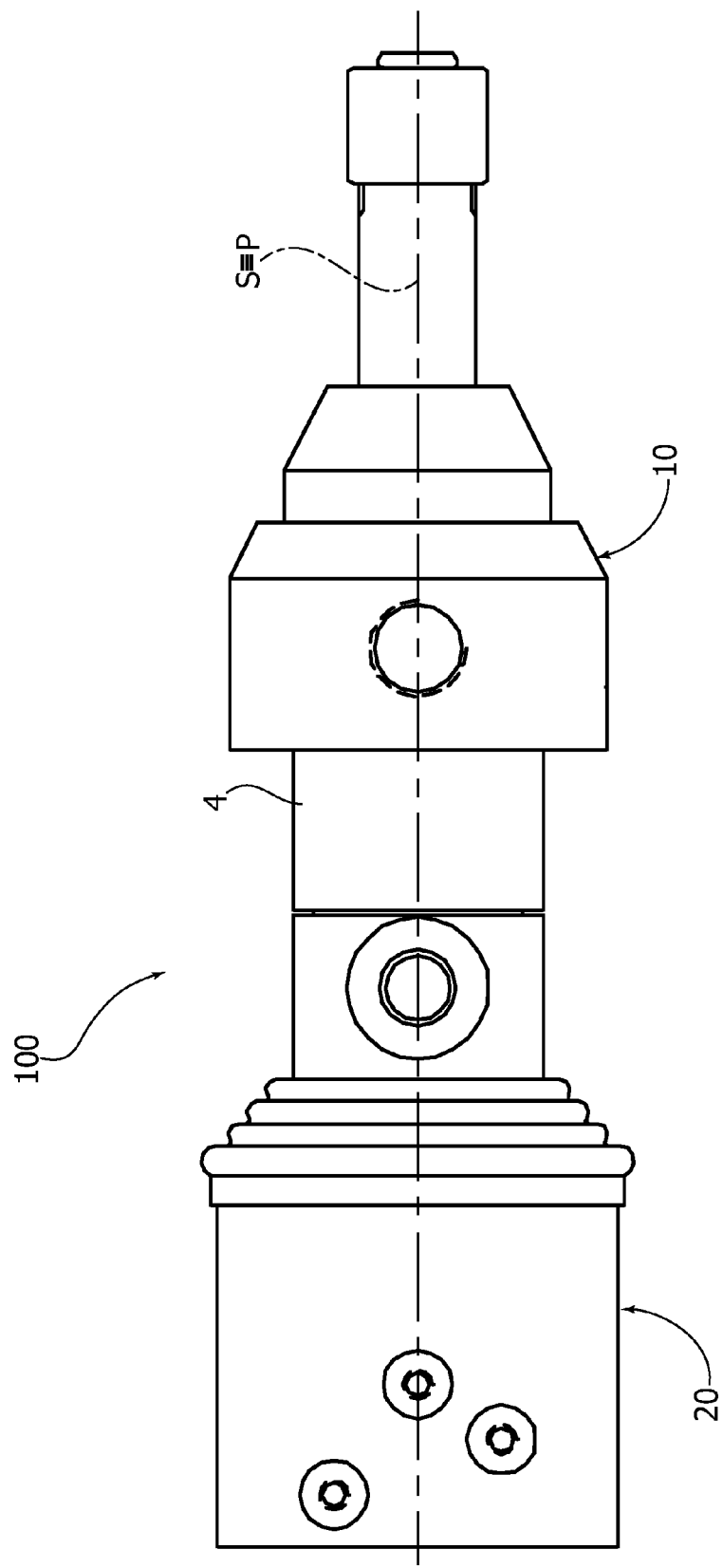
FIG. 1 is a front view of a tool head comprising a first embodiment of the system described herein.

FIG. 1 illustrates a tool head 100 comprising a tool 10 and a tool-inclining system 20.

The tool of the example illustrated is a burring tool. It is, however, clear that the concepts described herein in relation to the invention may likewise be applied to any other type of tool.

The head 100 is designed to be carried by a positioning structure, which is usually mobile, for example an articulated robot arm. In operation, the structure in question moves the head along a pre-set path so as to bring the tool onto the various parts of the workpiece that are to be machined. In other applications, the head 100 is, instead, carried by a fixed structure and it is the workpiece that is moved with respect to the tool.

The tool is kept by the tool-inclining system 20 in a neutral position, i.e., in a condition where the axis S of the tool is aligned with the main axis P of the head. However, in given conditions that will be described hereinafter, via the system 20 the tool 10 can also move away from the above position and tilt to one side. This tilting movement enables the tool to adapt its position according to the characteristics of the workpiece so as to be able to guarantee a uniform machining quality.

In general, the tool-inclining system described herein comprises:

a base 2 for securing the system to the structure mentioned above that is to carry the entire tool head 100;

a support 4 on which the tool is fixed;

a connection member that connects the support 4 to the base 2 so as to allow a given angular displacement of the support, as a result of which the axis S of the tool performs, starting from its neutral position, a tilting movement; and fluid countering means acting on the support so as to exert an action that counters the aforesaid tilting movement.

Figure 2A:
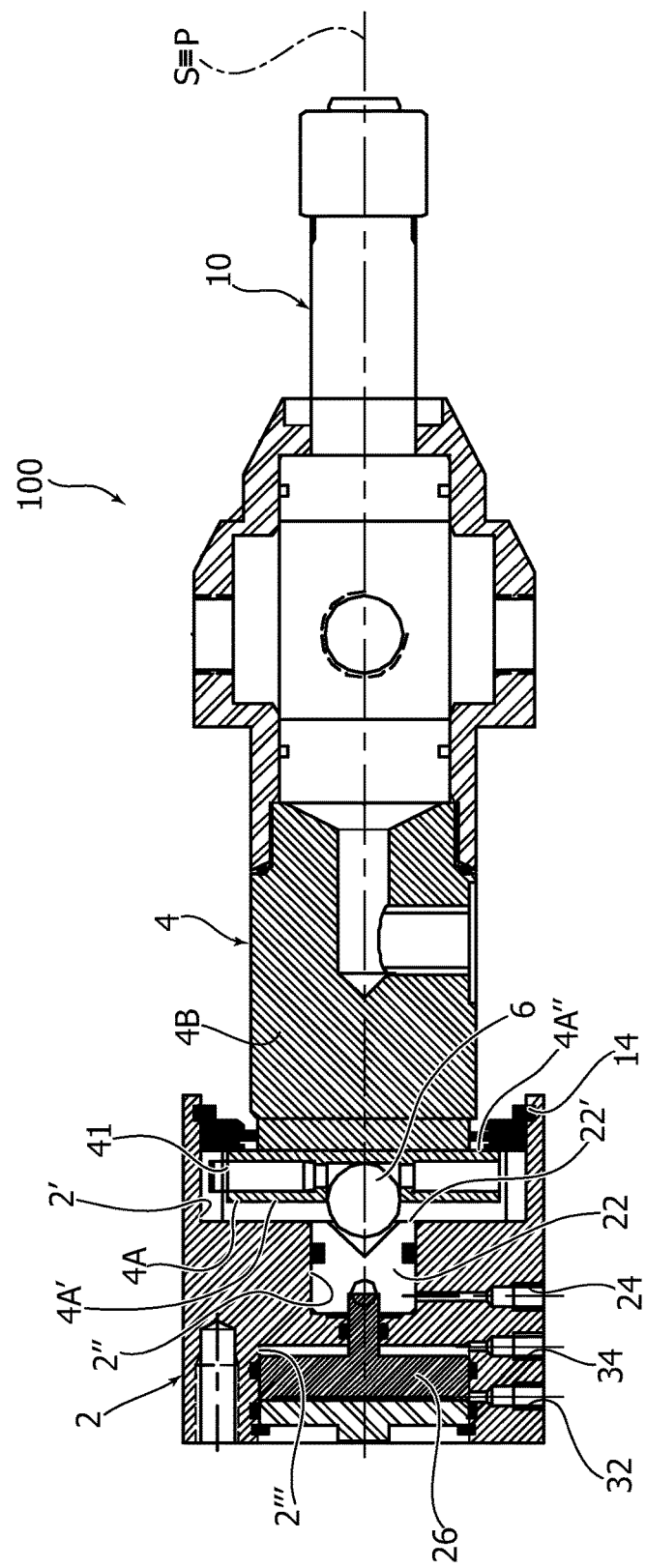
FIGS. 2A and 2B represent a view in vertical section of the head of FIG. 1 in two respective positions.
Figure 2B:
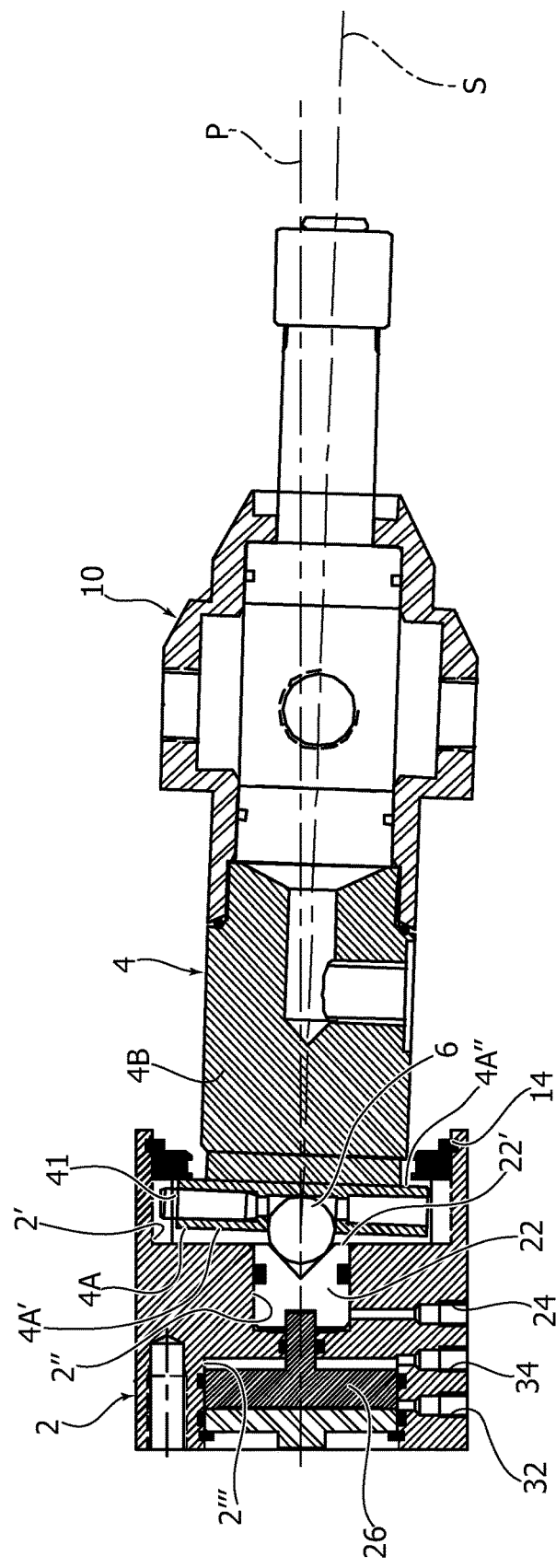

With reference now to the embodiment illustrated in FIGS. 1 and 2A, 2B, the support 4 is constituted by a body provided with a disk-shaped base portion 4A and by a substantially cylindrical portion 4b that extends starting from the base portion. The base 2 has an end in which a cylindrical cavity 2' is provided, housed within which is the base portion 4A of the support.

The base portion 4A rests with its outer face 4A' on a spherical body 6 constituting the connection member mentioned above. The base 2 comprises a ring-shaped block 14, which is fixed in the top region of the wall delimiting the cavity 2' and is to engage the face 4A" of the portion 4A, opposite to the face 4A', in such a way that the aforesaid face 4A" comes to bear thereon, thus limiting movement of the portion 4A within the cavity and ensuring connection of the support 4 to the base 2.

Figure 6:
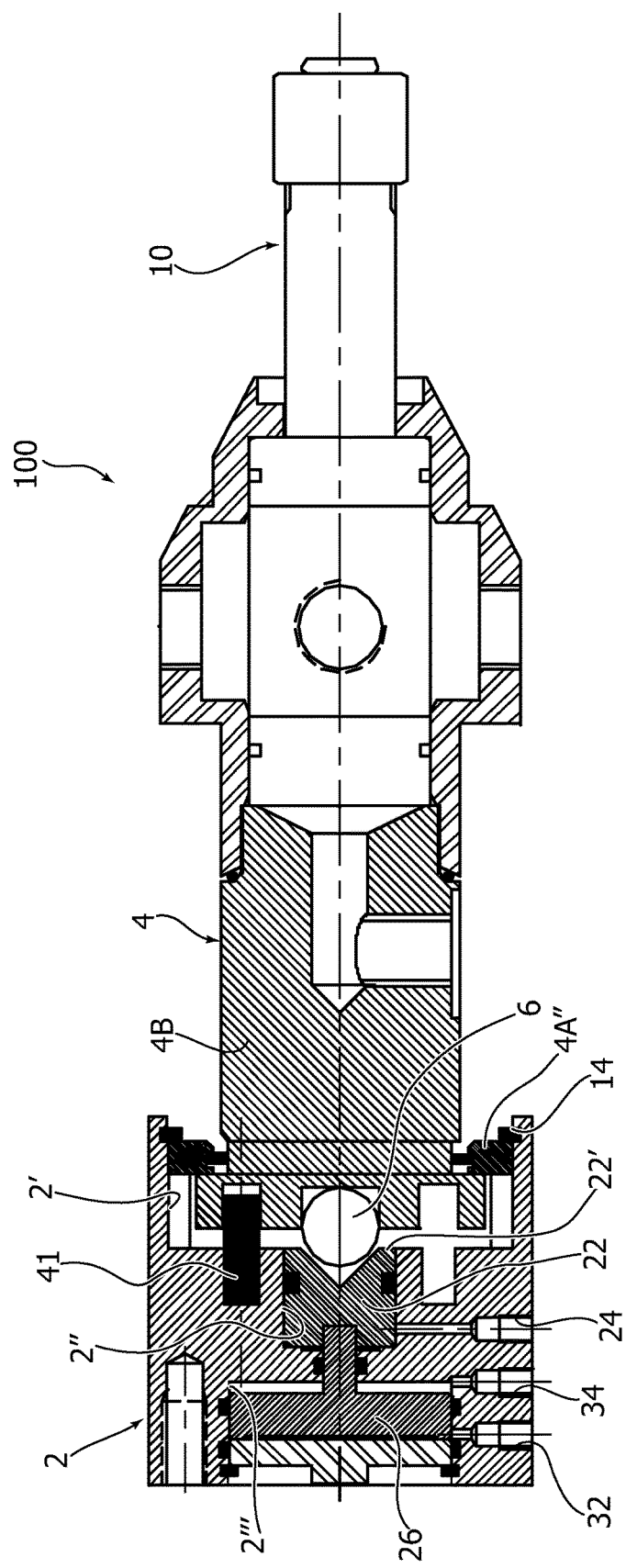
FIG. 6 is a partially sectioned front view of a fifth embodiment of the system described herein.

The base portion 4A moreover has at least one pin 41 that engages a corresponding housing provided in the base 2, in an area corresponding to the cavity 2', within which the pin 41 is free to slide in a direction parallel to the axis P of the head but is, instead, prevented from moving in directions transverse to this axis. The pin 41 and the corresponding housing in the base 2 are designed to prevent rotation of the support 4 about its own axis. In alternative embodiments, the pin 41 may, instead, be carried by the base 2, and the corresponding housing may be obtained in the base portion 4A. Moreover, in the embodiment illustrated in FIGS. 2A-2B, the pin 41 is oriented radially with respect to the axis P of the head. In alternative embodiments, as in the one illustrated in FIG. 6, the pin may, instead, be oriented parallel to the aforesaid axis.

The fluid means comprise a first piston 22 housed within a second cavity 2", which is provided in the end wall of the cavity 2' and has, on its surface 22' facing the cavity 2', a flared portion that is engaged by the ball 6. The cavity 2" is connected to a duct 24 for inlet of the working fluid.

The fluid means further comprise a second piston 26 set within a further cavity 2''' provided in the base 2. The piston 26 has a pin that traverses a hole made in the wall that divides the cavities 2" and 2''', and that comes to engage a seat provided in the surface 22" of the piston, opposite to the surface 22'. The chamber 2''' is connected to the ducts 32, 34, which are designed to carry the working fluid onto the two respective opposite faces of the piston 26. Thanks to the small difference in size between the opposite faces of the piston 26, the latter enables precise adjustment of the force generated as a whole by the ensemble of the two pistons.

The pistons 22 and 26 exert an action of thrust on the ball 6, which in turn pushes the base portion 4A of the support 4 against the block 14 of the base 2. The axis S of the tool is thus kept in its neutral position.

The pressure exerted by the working fluid on the pistons determines the maximum force that the tool can withstand remaining in its neutral position.

As may be seen in the example of FIG. 2B, in the case of loads higher than the aforementioned maximum force, the tool deviates from its neutral position, tilting in the direction of action of the load.

It is now to be noted that, during operation, as has been seen above, the tool is moved with respect to the piece along a pre-set path. This path obviously does not take into account the possible defects that the workpieces may present locally, which are intrinsic to the processes with which the pieces are obtained. Consider, for example, foundry pieces, the finish of which is rather rough. Consequently, when the tool is brought up to parts that do not respect the ideal geometry of the workpiece, it is subject to a load that causes variation of the force of contact between the tool and the workpiece. For what has just been said, in the tool head described herein, in these circumstances the tool assumes a position tilted with respect to its neutral position and in this way compensates deviation of the workpiece from the reference geometry.

According to the type of application, it is also possible to activate just the piston 22 in order to render the system very flexible, or else, together with the piston 22, activate the piston 26 just on the side connected to the inlet 32 in order to render the system very stiff. For rough machining operations, the condition where just the piston 22 is activated is preferable.

Figure 3:
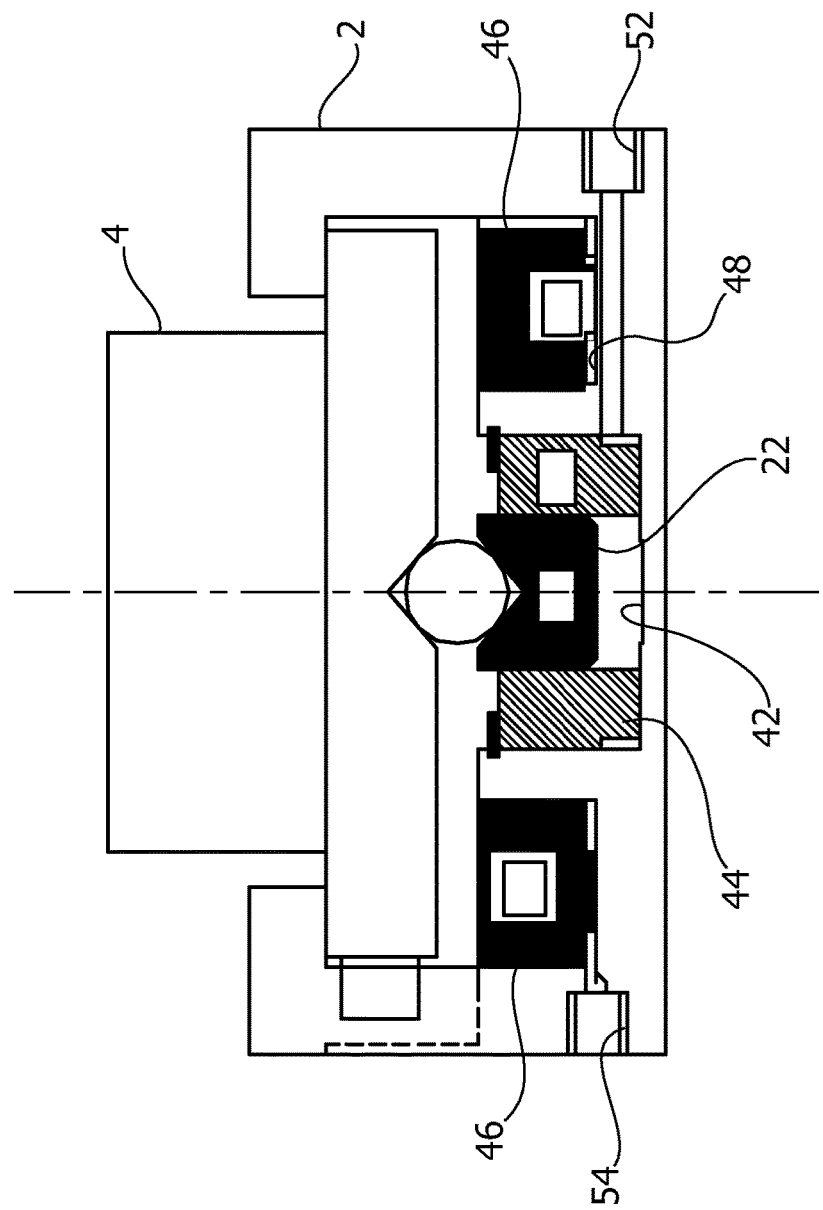
FIG. 3 is a partially sectioned front view of a second embodiment of the system described herein.

FIG. 3 illustrates an alternative embodiment of the tool-inclining system described herein, which is particularly suited to applications in which heavy loads are generated. The parts in common with the embodiment illustrated above are designated by the same reference numbers.

In the above embodiment, the piston 22 is housed within a cavity 42 provided in the base 2, via interposition of a ring 44. The ring 44 is fixed within the cavity 42 and has an internal hole of a size appropriate for withholding the piston 22 according to a slidable and fluid-tight coupling.

The ring 44 operates as a sort of adapter for installation of the piston 22 on the base 2. It is in fact possible to provide a plurality of pistons of different diameter, which are interchangeable via a corresponding series of rings 44 having internal holes that adapt to the diameters of the respective pistons.

In the system according to the above embodiment, the fluid means further comprise two or more pistons 46 arranged within one and the same annular chamber 48 provided in the base 2, in positions radially opposed with respect to the piston 22. As an alternative, it is possible to provide a single piston of an annular shape, within the chamber 48. The chamber 42 communicates with the inlet duct 52, whereas the chamber 48 communicates with the inlet duct 54. The pressure exerted by the working fluid on the pistons 22 and 46 determines the value of the maximum force that the head is able to withstand maintaining its neutral position. According to the type of application, it is possible to envisage actuation of just the piston 22 so that the maximum force in question is lower and, as a whole, the system is hence more flexible.

In embodiments alternative to the two embodiments illustrated above, the member for connection of the support 4 to the base 2 may be constituted by a pin rotatably mounted on which is the support 4, which defines a specific tilt axis, orthogonal to the axis S of the tool. In this type of embodiment, the fluid means comprise a piston mobile in a direction contained in a plane orthogonal to the aforesaid pin.

Figure 4A:
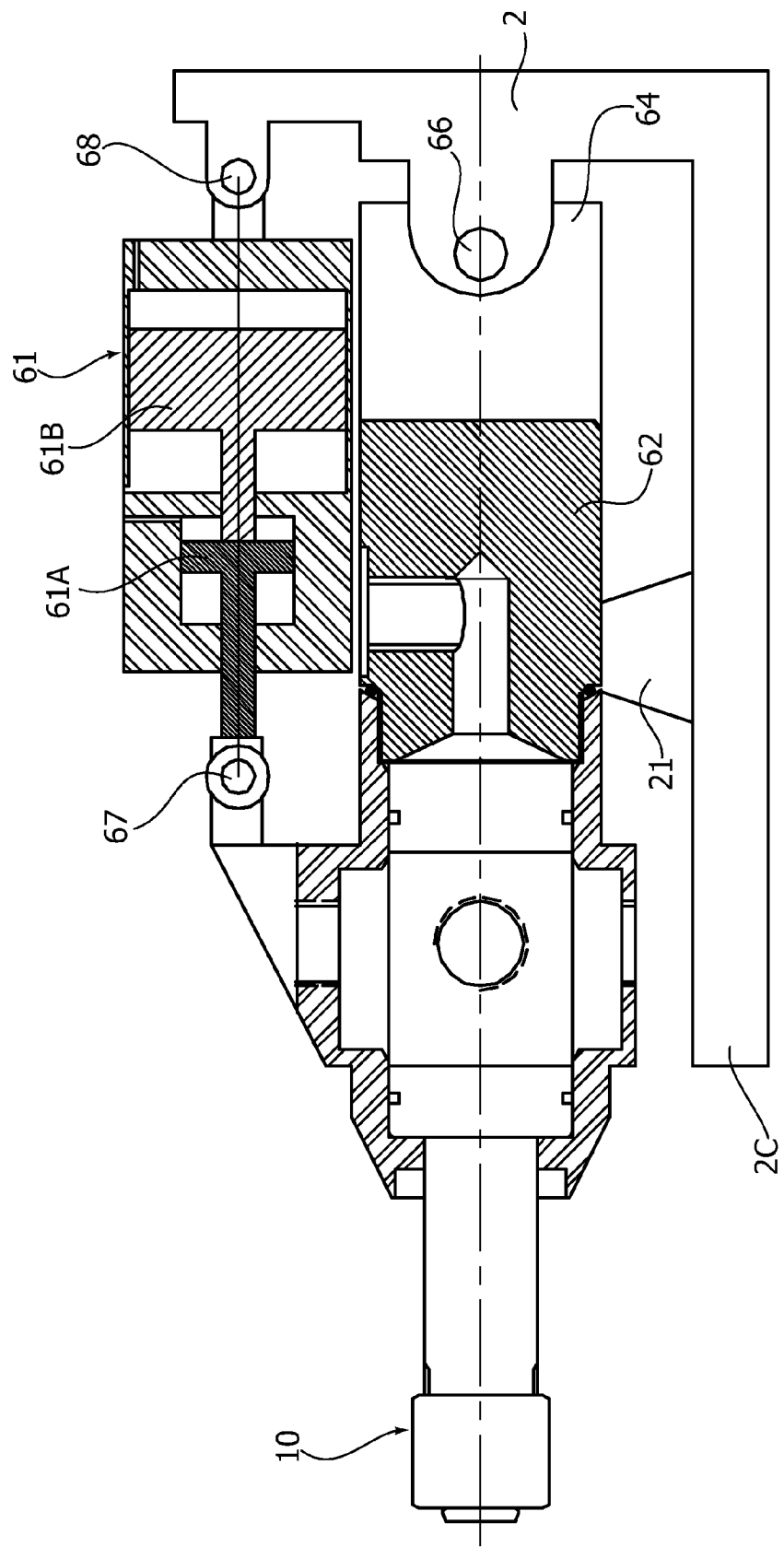
FIGS. 4A and 4B represent a partially sectioned side view of a third embodiment of the system described herein, in two respective different positions.
Figure 4B:
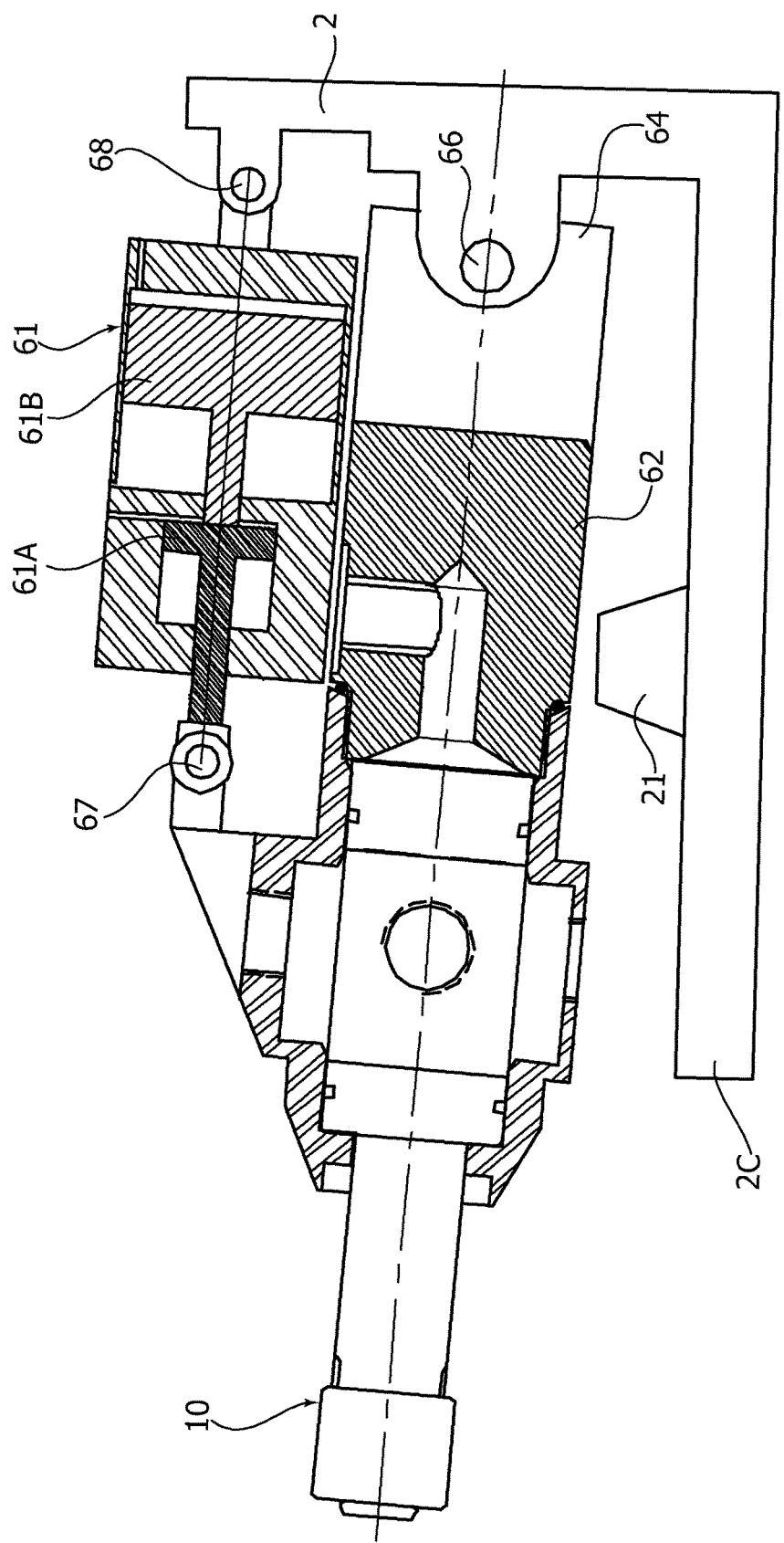

FIGS. 4A-4B illustrate a first example of the above alternative embodiment. The parts in common with those of the embodiments illustrated above are designated by the same reference numbers. In this embodiment, the support 4 is constituted by a substantially cylindrical body having a first portion 62 for connection of the support to the tool, and a base portion 64, which is articulated to the base 2 via a pin 66 carried by two opposed flanges of the base 2. The pin 66 is oriented in a direction orthogonal to the direction P of the tool head.

The fluid means comprise a multiple-stage cylinder 61, the casing of which is articulated to a second pin 68 carried by the base 2 and parallel to the pin 66. The mobile end of the cylinder is connected in an articulated way to a bracket carried by the tool 10, about a pin 67 parallel to the pins 66 and 68.

The cylinder 61 comprises, in particular, a first piston 61A and a second piston 61B, which are each housed in a respective chamber. The second piston 61B comprises a pin that traverses the wall that separates the two chambers and comes to engage the piston 61A. The chamber of the piston 61B is connected to two ducts designed to inject the working fluid onto the two respective opposite faces of the piston. The piston 61B enables precise adjustment of the force as a whole exerted by the two pistons, thanks to the small difference in size between its two opposite surfaces. In a way similar to the operation described above with reference to the pistons 26 and 22 of the previous embodiment, according to the specific applications it is in any case possible to actuate just the piston 61A in order to render the system particularly flexible, or else actuate the piston 61B, together with the piston 61A, injecting the working fluid only onto its surface further away from the piston 61A, in order to stiffen the system.

In preferred embodiments, the cylinder 61 and the corresponding pistons are characterized by an oval section so as to be able to generate high forces of thrust, albeit presenting a limited lateral encumbrance.

The base 2 moreover has a wall 2c arranged on the side of the tool opposite to the one engaged by the cylinder, on which a support 21 is provided, against which the tool comes to rest in its neutral position.

The cylinder 61 has the function of keeping the tool in its neutral position, pushing it against the support 21. The pressure of the working fluid within the cylinder determines the value of the maximum force that the tool is able to withstand without displacing from its neutral position. For higher loads, the tool tilts following the direction of the force applied thereon. Clearly, in this embodiment, the movement of oscillation that can be performed by the tool is only about the axis defined by the pin 66, and is delimited by the wall 2c of the base 2.

Figure 5A:
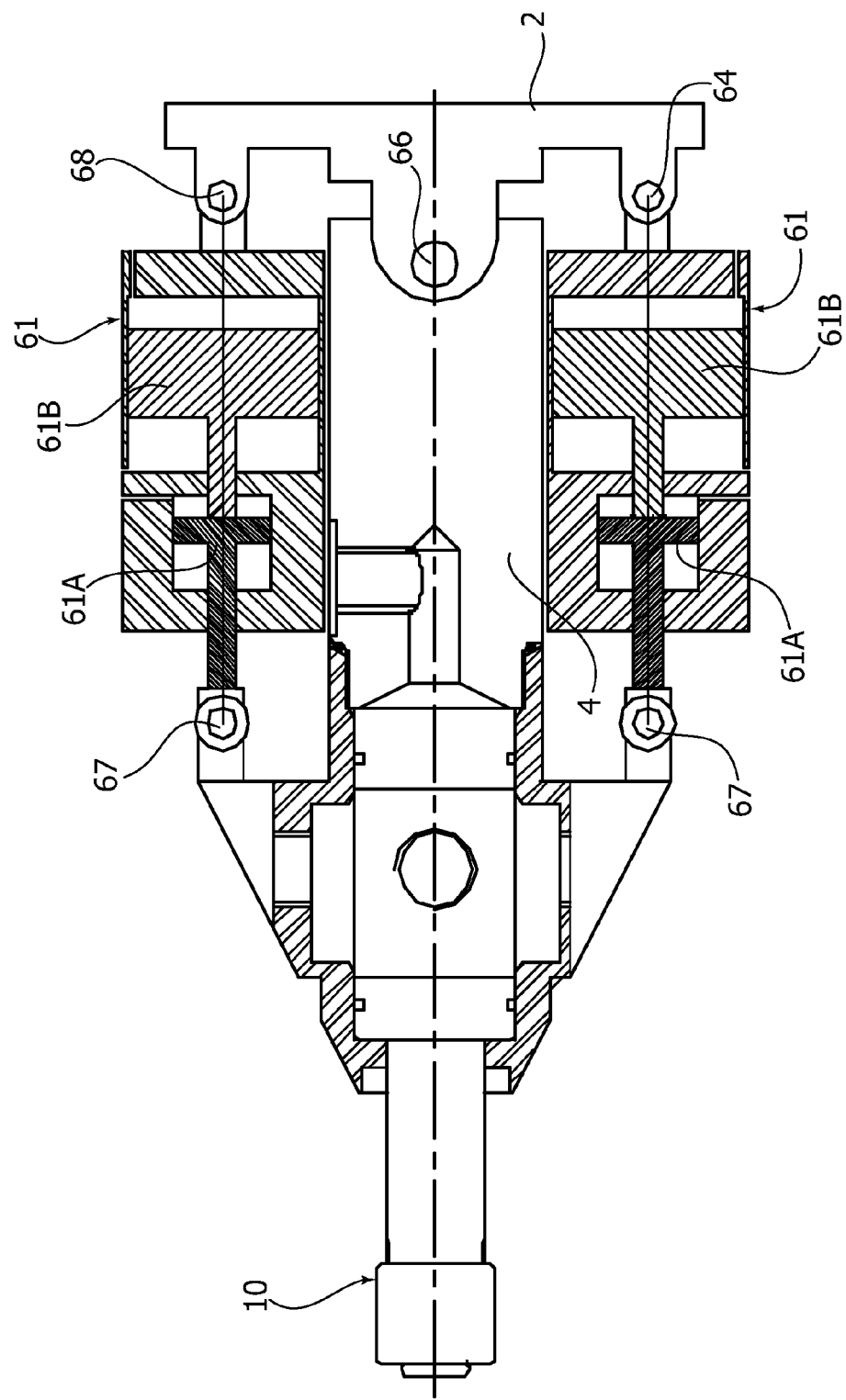
FIGS. 5A and 5B represent a partially sectioned side view of a fourth embodiment of the system described herein, in two respective different positions.
Figure 5B:
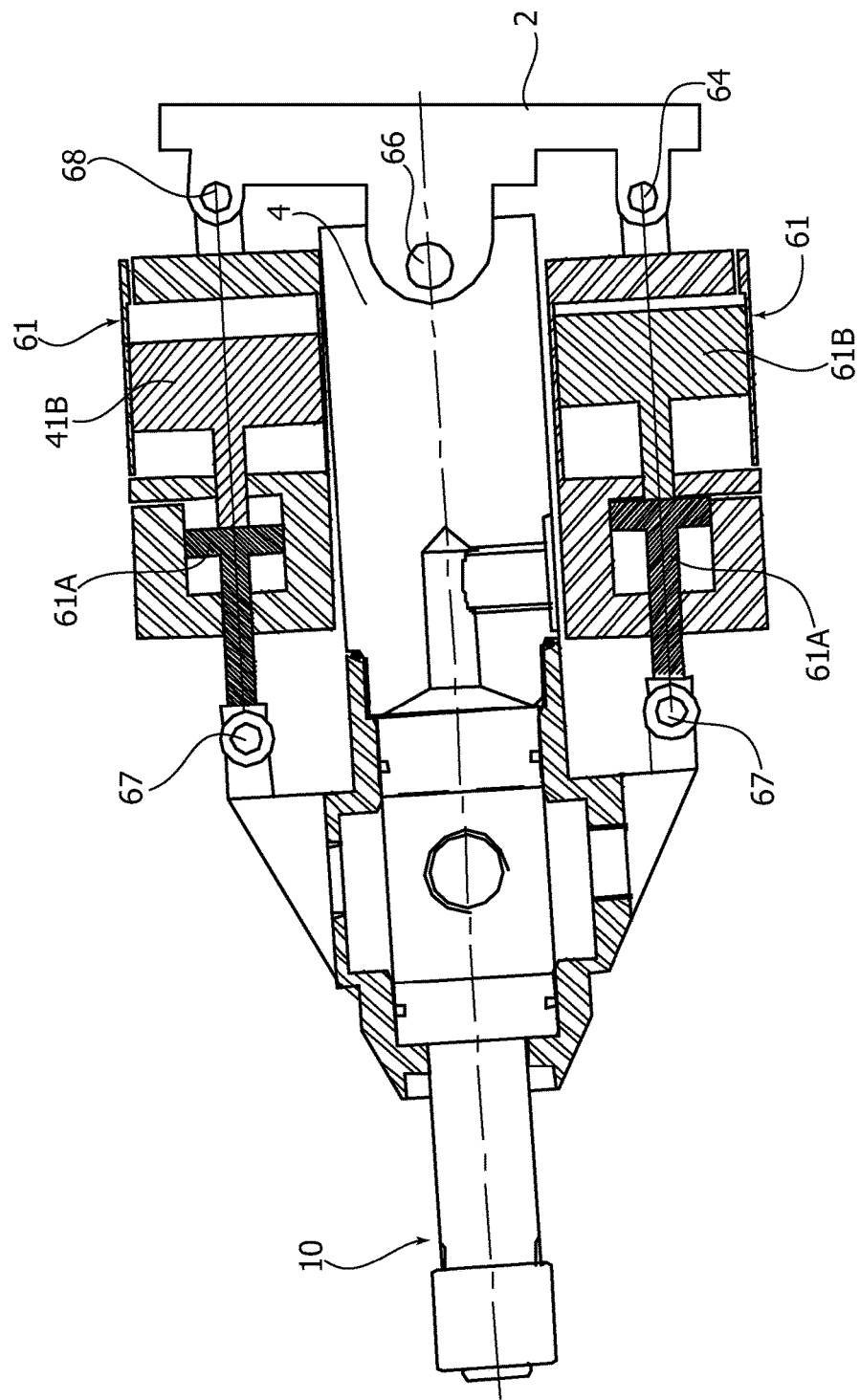

The embodiment illustrated in FIGS. 5A, 5B may be considered altogether equivalent to the one illustrated above, differing from the latter merely by the fact that an actuator cylinder is provided on both sides of the tool. The further cylinder 63 is connected to the base 2 and to the support 4 in the same way as described above with reference to the cylinder 61, and co-operates therewith in order to determine the maximum force referred to above. In this case, the tool is free to tilt, starting from its neutral position, in the two opposite directions.

The fluid means described herein may be pneumatic or else hydraulic.

Finally, it should be noted that the above means may possibly be replaced by elastic means, for example spring means, designed to act according to the same modalities as the ones described above in regard to the fluid means. In this case, the maximum force referred to above that can be exerted by the system is a function of the elastic coefficient that characterizes the above elastic means.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims.

The invention claimed is:

1. A tool-inclining system, comprising:
a base for securing said system to a structure that is to carry said tool;
a support on which said tool is to be fixed, said support being configured in such a way that said tool fixed to said support defines a working axis (S);
a connection member, which is set between said support and said base and is designed to connect said support to said base, said member allowing a given angular movement of said support so that said working axis displaces, starting from a neutral position, according to a tilting movement; and
fluid countering means, which act on said support so as to exert an action that counters said tilting movement,
wherein said connection member comprises a spherical body and said support is set on said spherical body, and said fluid countering means comprise a piston acting on said spherical body and a further piston that engages said piston acting on the spherical body, or an annular-shaped piston arranged within an annular chamber provided in said base, which surrounds said piston, the fluid pressure exerted by a working fluid on said piston and on said further piston or said annular-shaped piston determining the value of the maximum force that the support is able to withstand before said working axis displaces from said neutral position, and wherein said system comprises one or more elements fixed to said base and designed to act on said support to limit said tilting movement.

2. The system according to claim 1, comprising a ring fixed to said base, said piston is slidably mounted within said ring, said ring having an internal hole of a size selected according to the size of said piston, for receiving said piston according to a slidable and fluid-tight coupling, said ring being mounted on said base in a removable way.

3. The system according to claim 2, comprising a second piston having at least one transverse dimension different from that of said piston, said second piston being interchangeable with said piston via a second ring having an internal hole of a size corresponding to the size of said second piston.

4. The system according to claim 1, comprising means of constraint set between said support and said base, which are designed to prevent any rotation of said support about said working axis.

5. The system according to claim 1, wherein the structure is a robot arm.

6. A tool-inclining system, comprising:
a base for securing said system to a structure that is to carry said tool;
a support on which said tool is to be fixed, said support being configured in such a way that said tool fixed to said support defines a working axis (S);
a connection member, which is set between said support and said base and is designed to connect said support to said base, said member allowing a given angular movement of said support so that said working axis displaces, starting from a neutral position, according to a tilting movement; and
fluid countering means, which act on said support so as to exert an action that counters said tilting movement,
wherein said connection member comprises a pin defining a tilt axis, on which said support is rotatably mounted so that it can turn about said tilt axis, and wherein said fluid countering means comprise at least one piston mobile in a direction contained in a plane orthogonal to said tilt axis,
wherein said fluid countering means comprise a plurality of pistons that can be activated jointly in order to adjust the total force exerted on said support,
wherein said plurality of pistons comprise a first piston housed in a first chamber, and a second piston housed in a second chamber divided from said first chamber by a wall, wherein said second piston comprises a pin that traverses said wall and comes to engage said first piston, and
wherein said second chamber of said second piston is connected to two ducts, which are designed to inject a working fluid onto two opposite faces of said second piston, said opposite faces showing a difference in size that is given by the cross-section of said pin.

7. The system according to claim 6, comprising means of constraint set between said support and said base, which are designed to prevent any rotation of said support about said working axis.

8. The system according to claim 6, wherein the structure is a robot arm.

9. A tool-inclining system, comprising:
a base for securing said system to a structure that is to carry said tool;
a support on which said tool is to be fixed, said support being configured in such a way that said tool fixed to said support defines a working axis;
a connection member, which is set between said support and said base and is designed to connect said support to said base, said member allowing a given angular movement of said support so that said working axis displaces, starting from a neutral position, according to a tilting movement; and
fluid countering means, which act on said support so as to exert an action that counters said tilting movement
said system being characterised in that said connection member comprises a spherical body set on which is said support, and
said fluid countering means comprise a first piston acting on said spherical body and set within a first cavity, and a second piston that is set within a second cavity divided from said first cavity by a wall, wherein said second piston is provided with a pin traversing a hole made in said wall and engaging said first piston, said first and second pistons being apt to exert together an action of thrust on the spherical body, wherein said second cavity is connected to ducts designed to carry a working fluid onto two opposite faces of said second piston, said opposite faces showing a difference in size that is given by the cross-section of said pin, and wherein said system comprises one or more elements fixed to said base and designed to act on said support to limit said tilting movement.

10. The system according to claim 9, wherein the structure is a robot arm.

\* \* \* \* \*